(12) United States Patent
Takada et al.

(10) Patent No.: US 7,409,255 B2
(45) Date of Patent: Aug. 5, 2008

(54) MODULE EVALUATION METHOD AND SYSTEM

(75) Inventors: Masatoshi Takada, Hitachi (JP); Koichi Murayama, Hitachi (JP); Kenji Akagi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/674,279

(22) Filed: Feb. 13, 2007

(65) Prior Publication Data

US 2007/0260344 A1 Nov. 8, 2007

(30) Foreign Application Priority Data

Feb. 20, 2006 (JP) ............... 2006-042821

(51) Int. Cl.
*G06F 19/00* (2006.01)
*E04B 1/00* (2006.01)
(52) U.S. Cl. ......................... 700/97; 52/79.1
(58) Field of Classification Search .......... 700/28, 700/29, 36, 95–97, 99, 100, 106; 705/7–10, 705/26, 400; 52/79.1, 741.1; 703/1; 434/72
See application file for complete search history.

(56) References Cited

U.S. PATENT DOCUMENTS

| | | | |
|---|---|---|---|
| 6,826,516 B1* | 11/2004 | Ito | 703/1 |
| 7,251,611 B2* | 7/2007 | Abbott et al. | 705/7 |
| 7,292,908 B2* | 11/2007 | Borne et al. | 700/182 |
| 2002/0052770 A1* | 5/2002 | Podrazhansky | 705/7 |
| 2004/0055225 A1* | 3/2004 | Dirauf et al. | 52/79.1 |
| 2005/0108982 A1* | 5/2005 | Formisano | 52/741.1 |
| 2005/0283371 A1* | 12/2005 | Tiramani | 705/1 |
| 2006/0106825 A1* | 5/2006 | Cozzi | 707/100 |
| 2006/0156684 A1* | 7/2006 | Foucher | 52/741.1 |

FOREIGN PATENT DOCUMENTS

| | | |
|---|---|---|
| JP | 10-143236 | 5/1998 |
| JP | 2002-355724 | 12/2002 |

* cited by examiner

*Primary Examiner*—M. N. Von Buhr
(74) *Attorney, Agent, or Firm*—Mattingly, Stanger, Malur & Brundidge, P.C.

(57) ABSTRACT

A module evaluation method and system which can quickly determine overall effectiveness of the modular construction method in an automatic manner, taking into account the transportation cost and so on. A module evaluation unit prepares constructed-equipment physical quantity data from constructed-equipment layout data, and determines an in-module unit-rate reduction effect resulted from executing construction work of the constructed equipment in the module in a factory where working efficiency is higher than a field. The module evaluation unit also determines a module transportation cost effect, a module temporary construction cost effect, and a density reduction effect that is resulted from a reduction of density in a space not occupied by a module with application of modularization and efficiency of installation work is increased. The module evaluation unit further determines a field physical-quantity reduction effect resulted from a reduction of physical quantity in the field and from a reduction of various overhead costs with application of the modularization. The determination results are displayed on a display.

14 Claims, 12 Drawing Sheets

| Constructed-Equipment Part ID | In-Part ID | Part Type | Element Type | Plant | Area | Module No. | Temporary Construction | Shape Type | Arrangement |
|---|---|---|---|---|---|---|---|---|---|
| SPOOL010 | 1 | spool | straight pipe | X1 | T1B01 | | | PIPE216.3,Sch40 | (15000,20000,10000),(17000,20000,10000) |
| SPOOL010 | 2 | spool | elbow | X1 | T1B01 | | | PIPE216.3,Sch40 | (19000,20000,10000),(17000,20000,10000),(19000,22000,10000) |
| PFORM005 | 1 | operating platform | square steel | X1 | T1B01 | M01 | | S100,100,6,6 | (12000,25000,8000),(12100,25100,7000) |
| PFORM005 | 2 | operating platform | grating | X1 | T1B01 | M01 | | GR25 | (12000,25000,8000),(18000,30000,8000) |
| STRCT003 | | structure | square steel | X1 | T1B01 | M05 | 1 | S300,300,9,9 | (32000,30000,10000),(32300,30300,9000) |
| SC001 | 1 | SC wall | plate | X1 | T1B01 | M01 | | T6 | (52000,38000,22000),(52000,88000,30000) |
| PIPE125 | | piping | straight pipe | X2 | T2F01 | | | PIPE76.3,Sch80 | (20000,15000,25000),(30000,15000,25000) |
| TANK015 | | equipment | tank | X2 | T2F01 | M02 | | TANK1000,50000 | (32000,20000,50000) |

FIG.3

(1) PIPEa,b (2) PELBa,b (3) Sa,b,c,d

(4) GRa (5) PLa

FIG.4

| Shape Type | Weight | Volume |
|---|---|---|
| PIPE114.3,Sch60 | 18.8 | 0.0103 |
| PIPE139.8,Sch60 | 26.3 | 0.0153 |
| PIPE165.2,Sch60 | 35.8 | 0.0214 |
| GR25 | 23.1 | 0.0250 |
| GR32 | 29.0 | 0.0320 |
| S100,100,6,6 | 17.0 | 0.01 |
| S300,300,9,9 | 106.0 | 0.09 |

| Construction ID | Target Constructed-Equipment Part ID 1 | Target Constructed-Equipment Part ID 2 | Type | Execution Place |
|---|---|---|---|---|
| WY001 | SPOOL010-1 | SPOOL010-2 | welding | field |
| WP005 | SPOOL010-2 | SPOOL010-3 | welding | prefabrication factory A |
| IM01 | M01 | | modular assembly | prefabrication factory A |
| IM02 | M02 | | modular assembly | prefabrication factory B |
| IS003 | STRCT003 | | structure assembly | field prefabrication C |

FIG.7

| Constructed-Equipment Part ID 1 | Arrangement |
|---|---|
| SPOOL010-1 | (15000,20000,8108),(17000,20000,8108) |
| SPOOL010-2 | (19000,20000,8108),(17000,20000,8108), (19000,22000,8108) |

FIG.8

| Constructed-Equipment Physical Quantity ID | Type | Area | Module No. | Execution Place | Temporary construction | Area (square measure) | Weight | Volume |
|---|---|---|---|---|---|---|---|---|
| WY001 | large-diameter welding point | T1B01 | | field | | | | |
| SP001 | spool | T1B01 | M01 | prefabrication factory A | | 2500 | 5 | 250 |
| WP003 | small-diameter welding point | T1B01 | M01 | prefabrication factory B | | | | |
| PFORM005 | operating platform | T1B01 | M01 | prefabrication factory A | | 1700 | 20 | 320 |
| STRCT003 | structure | T1B05 | M05 | field | 1 | 2500 | 35 | 250 |
| Total: 15 | large-diameter welding point | | M03 | prefabrication factory A | | | | |

| Constructed-Equipment Physical Quantity Type | Target Part/ Work Type | Condition | Unit | Field | Pre-fabrication Factory A | Pre-fabrication Factory B | Field Pre-fabrication A |
|---|---|---|---|---|---|---|---|
| large-diameter welding | welding | diameter of 76.3 or more | point | 3.1 | 1.2 | 1.4 | 2.9 |
| small-diameter welding | welding | diameter less than 76.3 | point | 1.6 | 0.7 | 0.6 | 1.4 |
| carrying-in of large-diameter spool | spool | diameter of 76.3 or more | point | 0.4 | 0.2 | 0.3 | 0.3 |
| support installation | support | | point | 5.2 | 1.6 | 1.8 | 5 |
| platform installation | platform | | m² | 5.1 | 0.9 | 0.8 | 3.1 |
| structure installation | structure | | ton | 11.1 | 7.2 | 7.1 | 10 |
| temporarily constructed structure installation | structure | temporary construction | ton | | 18 | 15 | 21 |

FIG.11

| (X, Y)-Lengths | Z-Length | Fixed Transportation Cost | Radix-Based Transportation Cost |
|---|---|---|---|
| 3.2 × 6.5 | 3.0 | 0 | 550 |
| 7.5 × 26 | 6.5 | 4000 | 2500 |
| 20 × 25 | 20.0 | 25000 | 35000 |

MODULE EFFECTIVENESS INDEX VALUES: 523, 300

MODULE EVALUATION METHOD AND SYSTEM

BACKGROUND OF THE INVENTION

1. Field of the Invention

The present invention relates to a module evaluation method and system for use with a modular construction method which is one of construction methods for plants, etc.

2. Description of the Related Art

The term "modular construction method" means a method for constructing and installing plant equipment through steps of prefabricating the equipment, such as piping and devices adjacent to each other, into modules, i.e., units of assembly constructed beforehand, transporting the modules to an installation site in a plant, and installing the modules in integral structure.

By utilizing the modular construction method, assembly work can be performed in a factory where environment is better and the work cost is lower than those in the site or field, thus resulting in a reduction of the total cost due to a reduction of the assembly and installation cost, etc. Also, lump wok for installation of the individual modules can reduce the amount of required field work that is subjected to severe method restrictions, thus resulting in a cut of the construction term.

The effect of the modular construction method depends on the arrangement of constructed equipment even in the same plant or in the same area within the plant. Namely, when the modular construction method is applied, the resulting effect is high in some area, is low in other area, and is minus in still other area. It is therefore important to select modules providing a high effect. Further, because design work required for the modular construction method is not performed when the modular construction method is not employed, such design work has to be effectively performed to minimize an additional cost.

Patent Document 1 (JP,A 10-143236) discloses one known technique for determining effectiveness of a modularization range in a plant. This disclosed technique determines effectiveness of the modularization based on assembly workability of structural components within the range of a module.

Also, Patent Document 2 (JP,A 2002-355724) discloses one known technique for automatically performing assembly and disassembly steps of general products. This disclosed technique determines the assembly and disassembly cost based on robot simulation of the assembly and disassembly steps of the products, and then determines the propriety of the assembly and disassembly steps depending on the amount of the cost.

SUMMARY OF THE INVENTION

The modular construction method applied to a plant does not mean simple replacement of assembly steps and procedures, but it is featured in transporting modules, which are prefabricated in a place differing from a final installation site, to the installation site and installing the modules there.

It is therefore required to perform overall economic evaluation on the modularization, taking into account not only the transportation cost, reinforcements used during the transportation and in a temporarily installed state other than a final installed state, but also influences upon workability and economic efficiency of structural components in adjacent regions in the installation site except for the modules.

In the related art, however, determination of overall effectiveness taking into account the transportation cost and so on is not performed, and whether the use of the modular construction method is proper cannot be quickly performed in an automatic manner.

An object of the present invention is to realize a module evaluation method and system which can quickly determine overall effectiveness of the modular construction method in an automatic manner, taking into account the transportation cost and so on.

According to the present invention, based on constructed-equipment layout data including constructed-equipment arrangement schedule data for a region where arrangement of constructed equipment is scheduled, constructed-equipment modularization work data, and arrangement data for transportation of the modularized constructed-equipment to the arrangement scheduled region, as well as on constructed-equipment physical quantity data representing the number, sizes and weights of individual units of the constructed equipment, calculations are made on a unit-rate reduction amount resulting from modularizing the constructed equipment, a transportation cost required for transporting the modularized constructed-equipment to the arrangement scheduled region, a temporary construction cost including a cost of reinforcing materials to reinforce the modularized constructed-equipment for transporting the modularized constructed-equipment to the arrangement scheduled region, and a field physical-quantity reduction effect cost corresponding to a reduction of physical quantity required for assembling the constructed equipment in the arrangement scheduled region, which is resulted from modularizing the constructed equipment. Further, a cost required for modularizing the constructed equipment and a cost reduction resulting from modularizing the constructed equipment are calculated, and the modularization is evaluated based on the calculated costs.

Thus, the present invention can realize the module evaluation method and system capable of quickly determining overall effectiveness of the modular construction method in an automatic manner, taking into account the transportation cost and so on.

DESCRIPTION OF THE PREFERRED EMBODIMENTS

Embodiments of the present invention will be described below with reference to the attached drawings.

Figure 1:
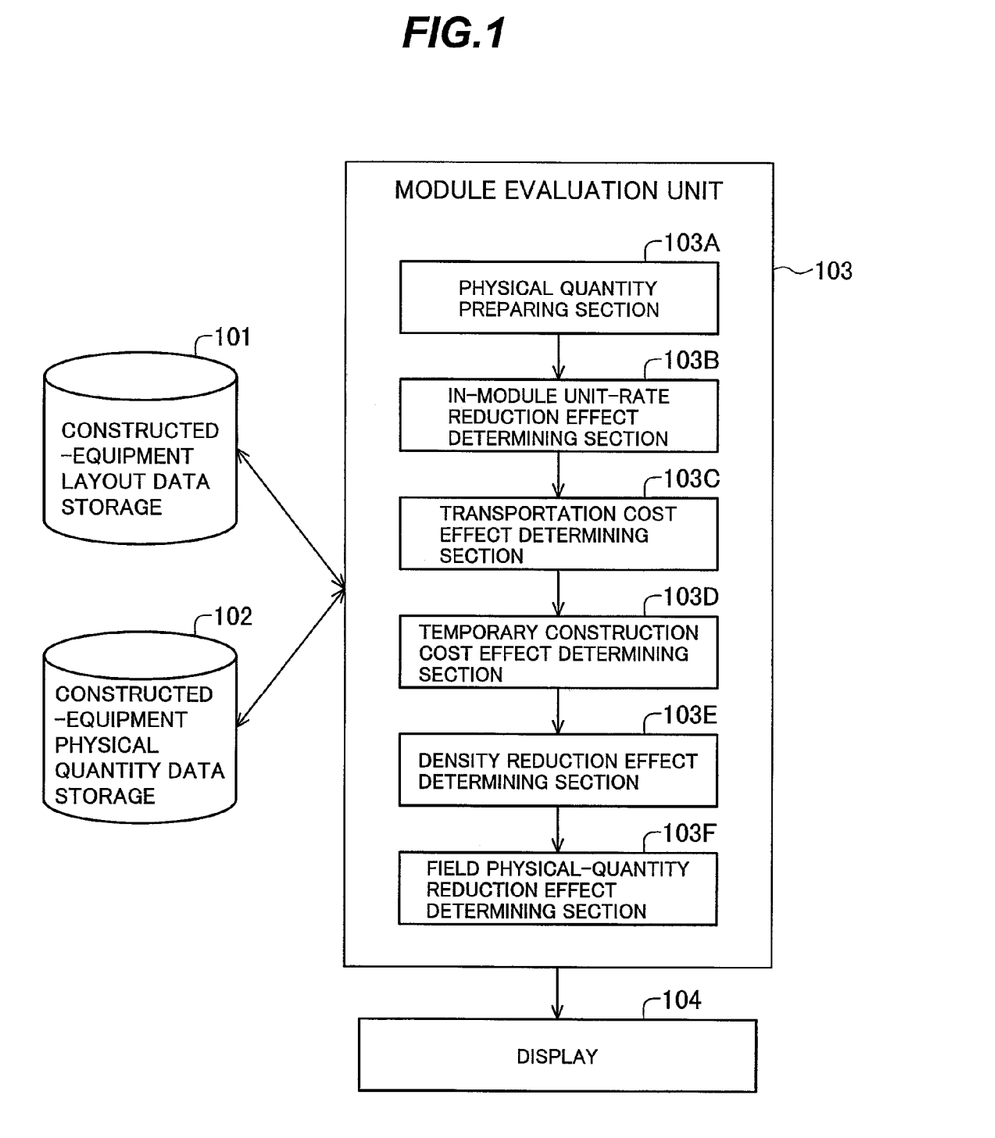
FIG. 1 is a block diagram of a module evaluation system to which is applied a first embodiment of the present invention.

FIG. 1 is a block diagram of a module evaluation system to which is applied a first embodiment of the present invention.

Referring to FIG. 1, the module evaluation system comprises a storage 101 for storing constructed-equipment layout data (including constructed-equipment arrangement schedule data for a region where arrangement of constructed equipment is scheduled, constructed-equipment modularization work data, and arrangement data for transportation of the modularized constructed-equipment to the arrangement scheduled region), a storage 102 for storing constructed-equipment physical quantity data (representing the number, sizes and weights of individual parts of the constructed equipment), a module evaluation unit 103, and a display 104.

The module evaluation unit 103 comprises a physical quantity data preparing section 103A, an in-module unit-rate reduction effect determining section 103B, a transportation cost effect determining section 103C, a temporary construction cost effect determining section 103D, a density reduction effect determining section 103E, and a field physical-quantity reduction effect determining section 103F.

The constructed-equipment layout data storage 101 stores the constructed-equipment arrangement data that contains data representing the shapes and arrangement of the constructed equipment, the constructed-equipment construction data that contains construction information of the constructed equipment, and the constructed-equipment transportation data that contains arrangement information of the constructed equipment during module transportation.

Figure 2:
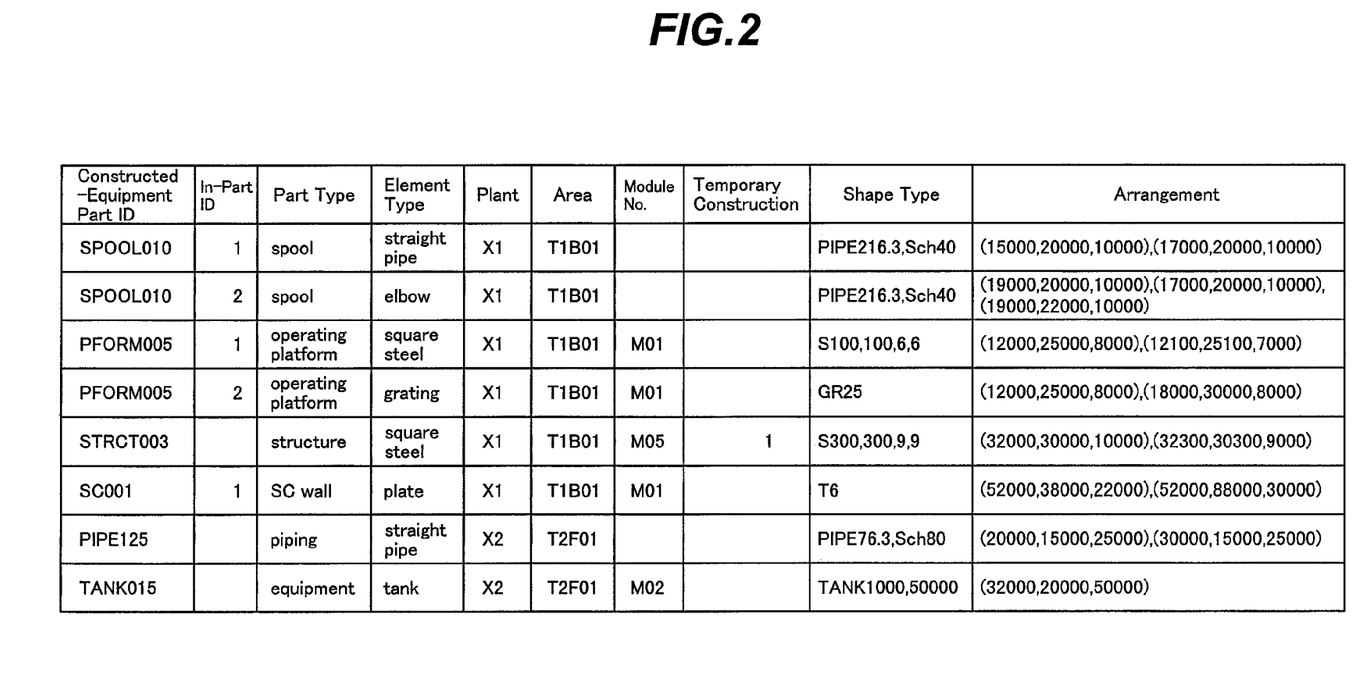
FIG. 2 shows one example of the data storage format of constructed-equipment arrangement data stored in a constructed-equipment layout data storage.

FIG. 2 shows one example of the data storage format of the constructed-equipment arrangement data stored in the constructed-equipment layout data storage 101.

In FIG. 2, each item of the constructed-equipment arrangement data is stored per minimum component element or shape element of the part. A column of "Constructed-Equipment Part ID" stores an identification ID per part unit of the constructed-equipment or per management unit such as a line. Because some part or some line is made up of a plurality of constructed-equipment elements, the same data may be stored in the column of "Constructed-Equipment Part ID". In such a case, the ID number within the relevant part is stored in a column of "In-Part ID" to identify each constructed-equipment element with combination of the Constructed-Equipment Part ID and the In-Part ID.

In the example of FIG. 2, a part having the Constructed-Equipment Part ID of, e.g., "PFORM005" is made up of two element parts. When a part is constituted by one constructed-equipment element, the column of "In-Part ID" can be left blank.

Columns of "Part Type" and "Element Type" store respectively a management part type as a constructed-equipment part and a part element type per constructed-equipment element. Columns of "Plant" and "Area" store respectively the name of a plant and the name of an area in which the constructed-equipment is finally installed.

Further, when the constructed-equipment part is set as a part integrated into a module, a column of "Module No." stores the number of the module as an integration target. When the constructed-equipment part is set as a temporarily constructed part, a column of "Temporary Construction" stores 1 as flag data. A column of "Shape Type" stores a shape type of the constructed-equipment part and dimensional data. A column of "Arrangement" stores arrangement attribute data with regard to the arranged position and dimensions of the constructed-equipment part.

Figure 3:
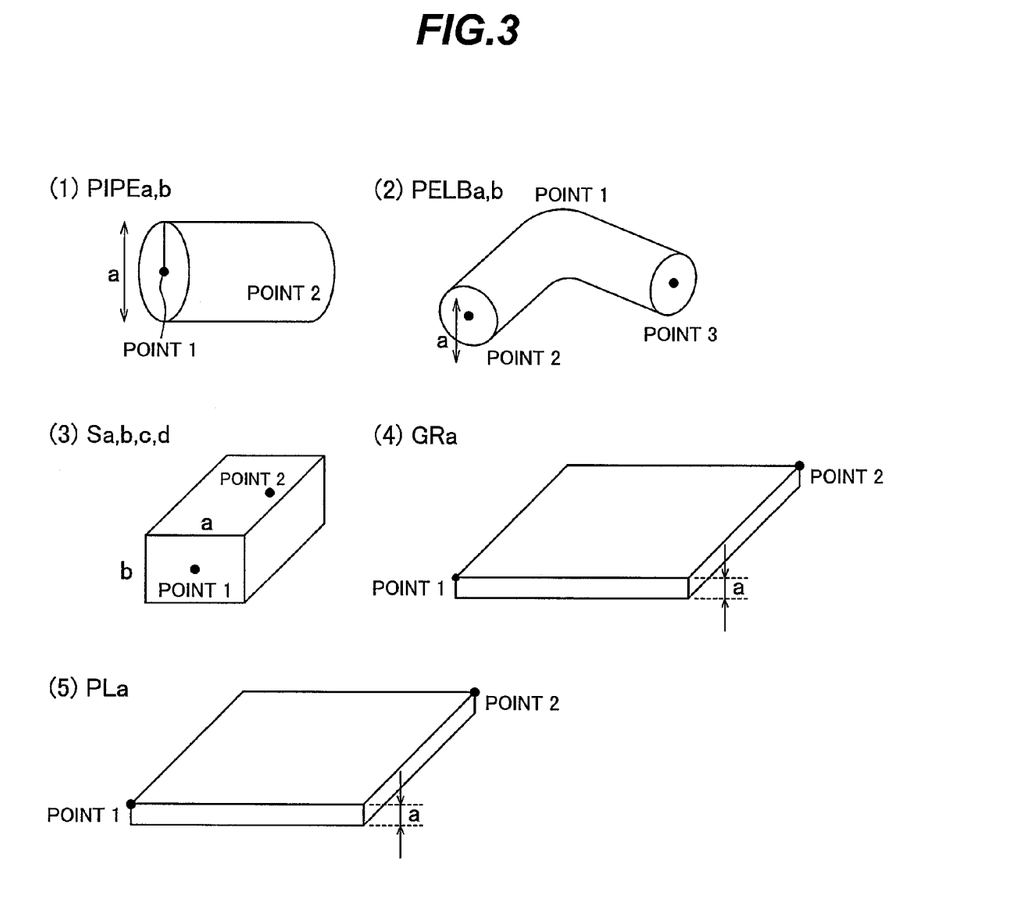
FIG. 3 shows one example of part shape library data.

The contents of the data stored in the column of "Arrangement" differ depending on the data in the column of "Shape Type". Also, the contents stored as shape attribute data corresponding to individual values of the shape type data and the drawing shapes of the parts corresponding to individual values of the shape attribute data are defined as part shape library data. FIG. 3 shows one example of the part shape library data.

Figure 4:
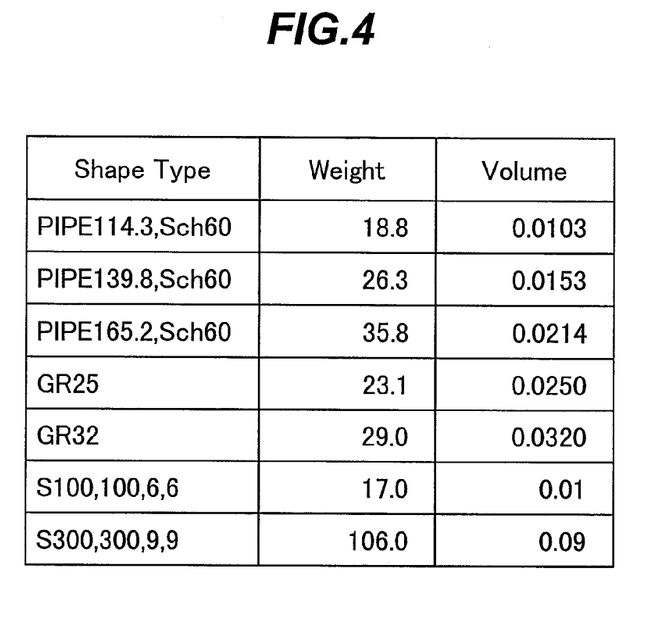
FIG. 4 shows one example of a part library table.

Values of weight or volume per unit length or area (square measure) of the constructed-equipment part, which correspond to individual values of the shape type data, are stored in a part library table. FIG. 4 shows one example of the part library table.

Figure 5:
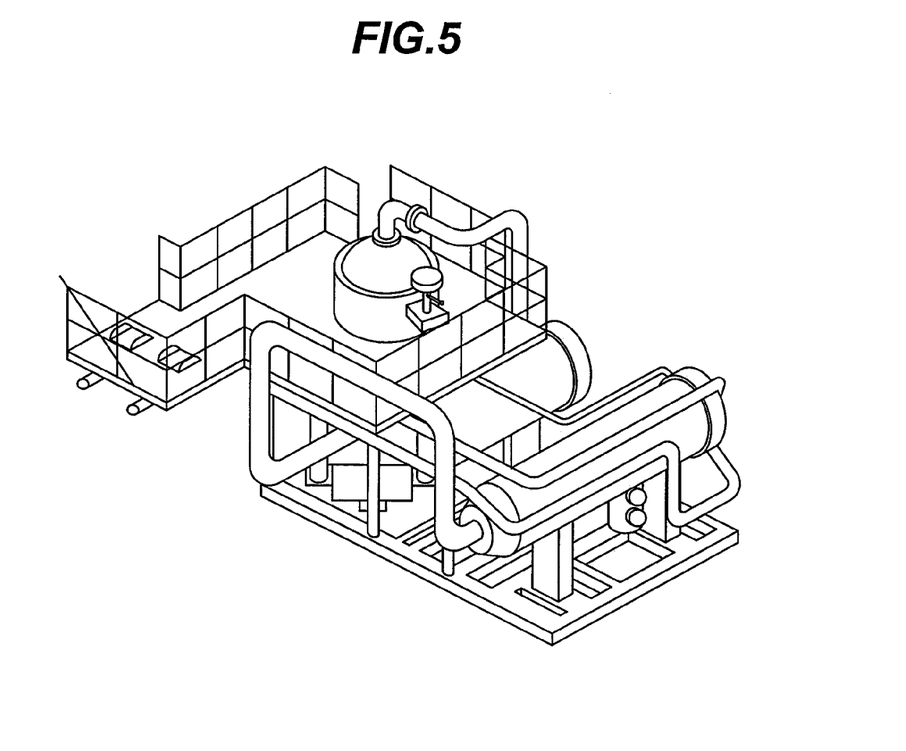
FIG. 5 shows one example of a 3D-CAD representation based on the constructed equipment arrangement data.

The constructed-equipment arrangement data shown in FIG. 2 is prepared by a user inputting the data through, e.g., a 3D-CAD input terminal. FIG. 5 shows one example of a 3D-CAD representation based on the constructed-equipment arrangement data prepared with 3D-CAD.

Figure 6:
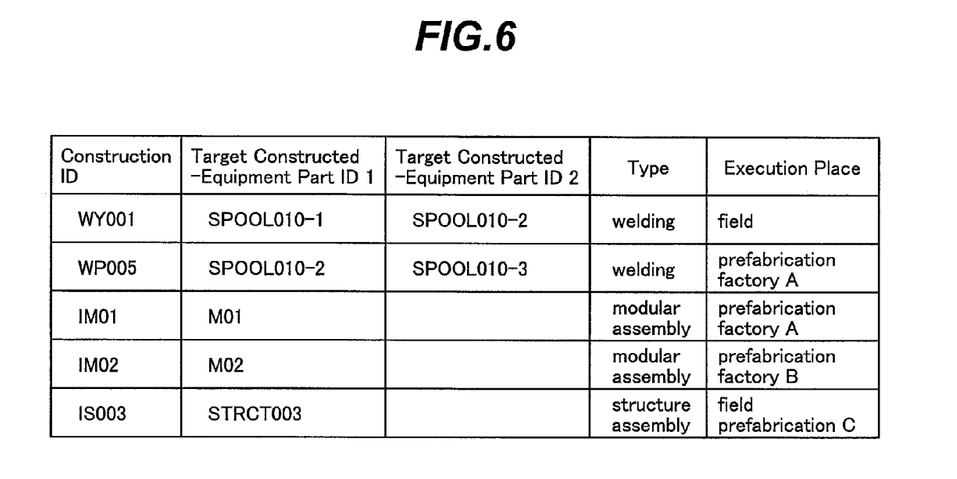
FIG. 6 shows one example of the data storage format of constructed-equipment construction data.

FIG. 6 shows one example of the data storage format of constructed-equipment construction data which contains construction information of the constructed equipment.

In FIG. 6, a column of "Construction ID" stores an ID value for identifying construction work. Columns of "Target Constructed-Equipment Part ID 1" and "Target Constructed-Equipment Part ID 2" each store an ID value or a module number of the constructed-equipment part as a target of the construction work. When the module number is stored, all the parts integrated into the module belong to the work target.

A column of "Type" stores a type of construction work. A column of "Execution Place" stores the name of a work place where the construction work is executed. The constructed-equipment construction data, shown in FIG. 6, is prepared by the user inputting the data with 3D-CAD or 2D-CAD based on projection display on a two-dimensional space.

Figure 7:
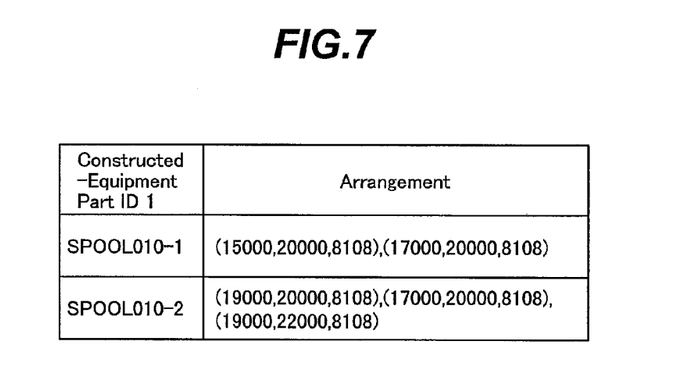
FIG. 7 shows one example of the data storage format of constructed-equipment transportation arrangement data.

FIG. 7 shows one example of the data storage format of the constructed-equipment transportation arrangement data that contains arrangement state information during transportation or carrying-in of the constructed-equipment parts.

In FIG. 7, a column of "Constructed-Equipment Part ID" stores the identification ID of the constructed-equipment part, and a column of "Arrangement" stores arrangement attribute data of the constructed-equipment part during transportation or carrying-in of the constructed-equipment part. The storage format of the arrangement attribute data is similar to that of the data stored in the column of "Arrangement" for the constructed-equipment arrangement data. The constructed-equipment transportation arrangement data is prepared by the user inputting the data with 3D-CAD.

Figure 8:
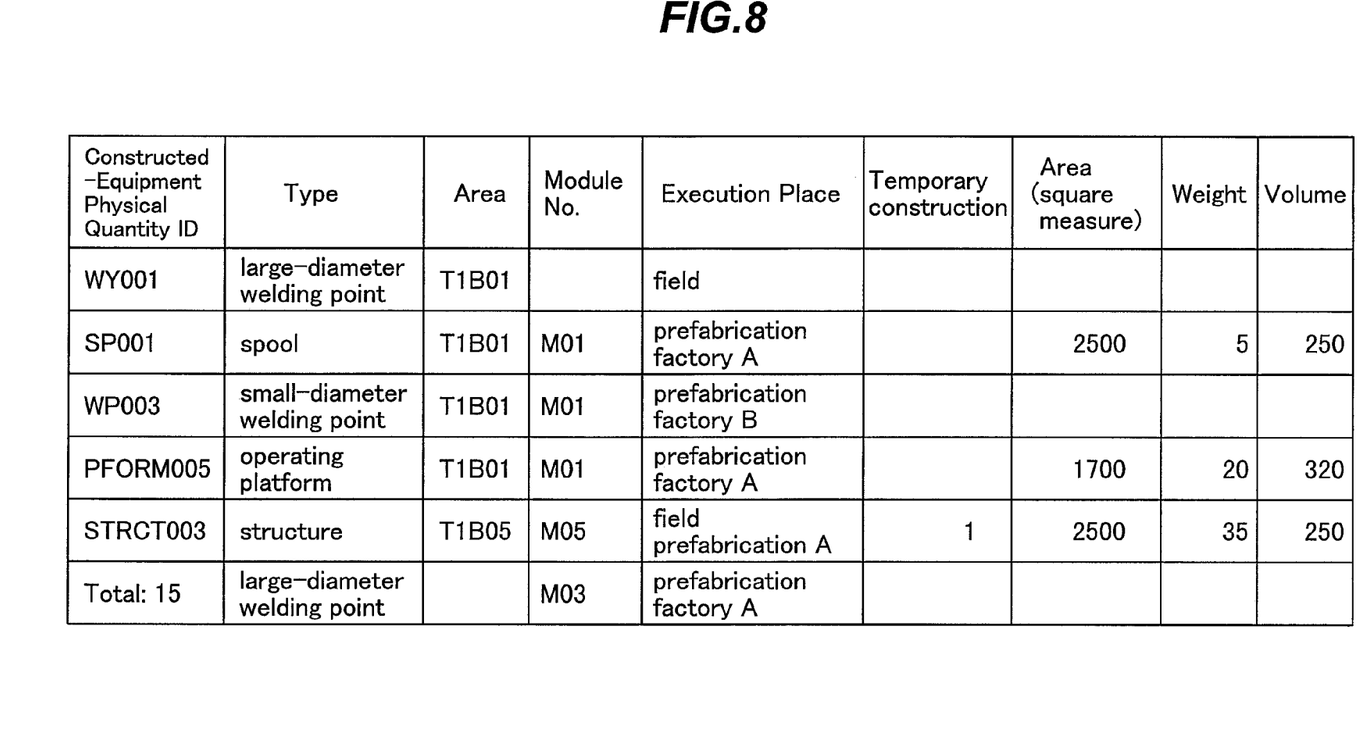
FIG. 8 shows one example of the data storage format of constructed-equipment physical quantity data.

In FIG. 1, the constructed-equipment physical quantity data storage 102 stores the constructed-equipment physical quantity data representing physical quantity information such as the number, volume, weight and work load of the constructed equipment. FIG. 8 shows one example of the data storage format of the constructed-equipment physical quantity data.

In FIG. 8, a column of "Constructed-Equipment Physical Quantity ID" stores a constructed-equipment part ID or a constructed-equipment construction ID. A column of "Type"

stores a part type or a construction type. A column of "Area" stores the name of an area in which the constructed-equipment is finally installed. Further, when the constructed-equipment part is set as a part integrated into a module, a column of "Module No." stores the number of the module as an integration target.

A column of "Execution Place" stores the name of a place where the construction of the constructed equipment is executed. When the constructed-equipment part is set as a temporarily constructed part, a column of "Temporary Construction" stores 1 as flag data. Columns of "Area (square measure)", "Weight", and "Volume" store respectively values of a flat area or length, weight, and volume of the constructed-equipment part.

The constructed-equipment physical quantity data shown in FIG. 8 is able to contain not only data per part of the constructed equipment, but also an average or total value of the physical quantity per type of the constructed equipment, per module number, and per execution place. In the latter case, the columns of "Diameter", "Length", "Weight", and "Volume" store respective average or total values. Further, the column of "Constructed-Equipment Physical Quantity ID" stores an identifier indicating the average or total value and the number of data values included.

Figure 9:
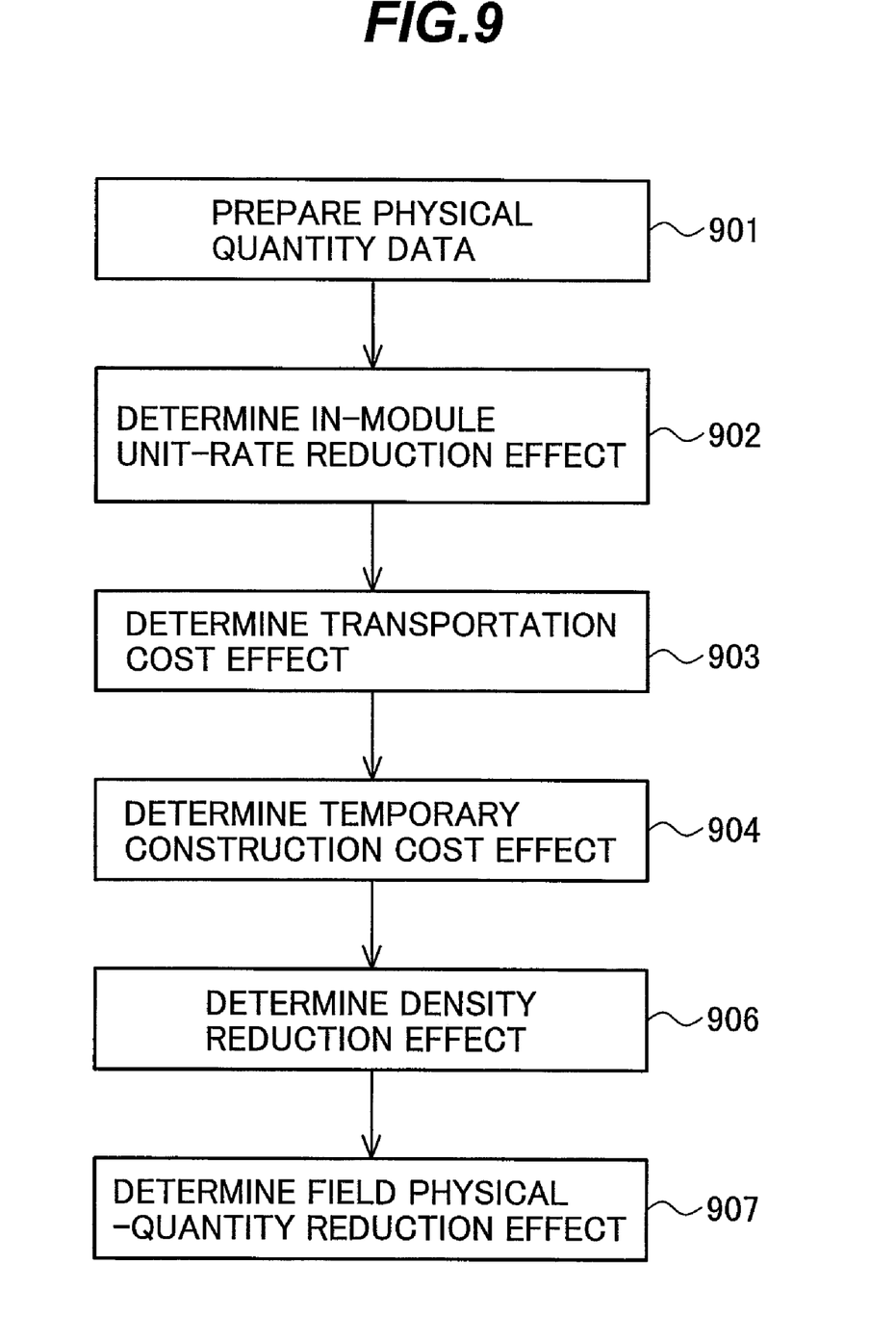
FIG. 9 is a flowchart of processing executed by a module evaluation unit.

In FIG. 1, the module evaluation unit 103 determines, on a module having the module number designated by the user, effectiveness of modularization and outputs a determination result. FIG. 9 is a flowchart of processing executed by the module evaluation unit 103.

In step 901 of FIG. 9, the constructed-equipment physical quantity data is prepared from the constructed-equipment layout data. More specifically, in step 901, the respective data in the columns of "Constructed-Equipment Physical Quantity ID", "Type", "Module No.", "Execution Place", and "Temporary Construction" are inputted from the constructed-equipment arrangement data and the constructed-equipment construction data. Also, the unit weight or volume of the shape type corresponding to each item of the constructed-equipment arrangement data is searched from the part library table and is multiplied by the unit length or area obtained from the shape type in the constructed-equipment arrangement data, to thereby calculate the weight or volume which is inputted as the constructed-equipment physical quantity data.

Then, each item of effect resulting from modularization is evaluated and determined using the constructed-equipment physical quantity data.

First, determination is made on an in-module unit-rate reduction effect that is resulted from executing the construction work of the constructed equipment in the module in a factory where working efficiency is higher than the field (step 902).

Assuming that the field installation unit rate is $u_y$ and the prefabrication-factory installation unit rate of the equipment integrated into the module is $u_p$, the unit rate reduction effect obtained per constructed equipment with modularization is given by $(u_y-u_p)$ and the effect index is given by multiplying the unit rate reduction effect by the physical quantity q of the constructed equipment, i.e., $(u_y-u_p) \times q$.

The unit rate reduction effect per module is given by a value of the following formula (1), which is obtained by totalizing, for each module, respective effects of all units of the constructed equipment integrated into the module other than the temporarily constructed equipment and the constructed work thereof:

$$\Sigma(u_y-u_p) \times q \qquad (1)$$

In the above formula (1), $\Sigma$ means totalization per module.

Figure 10:
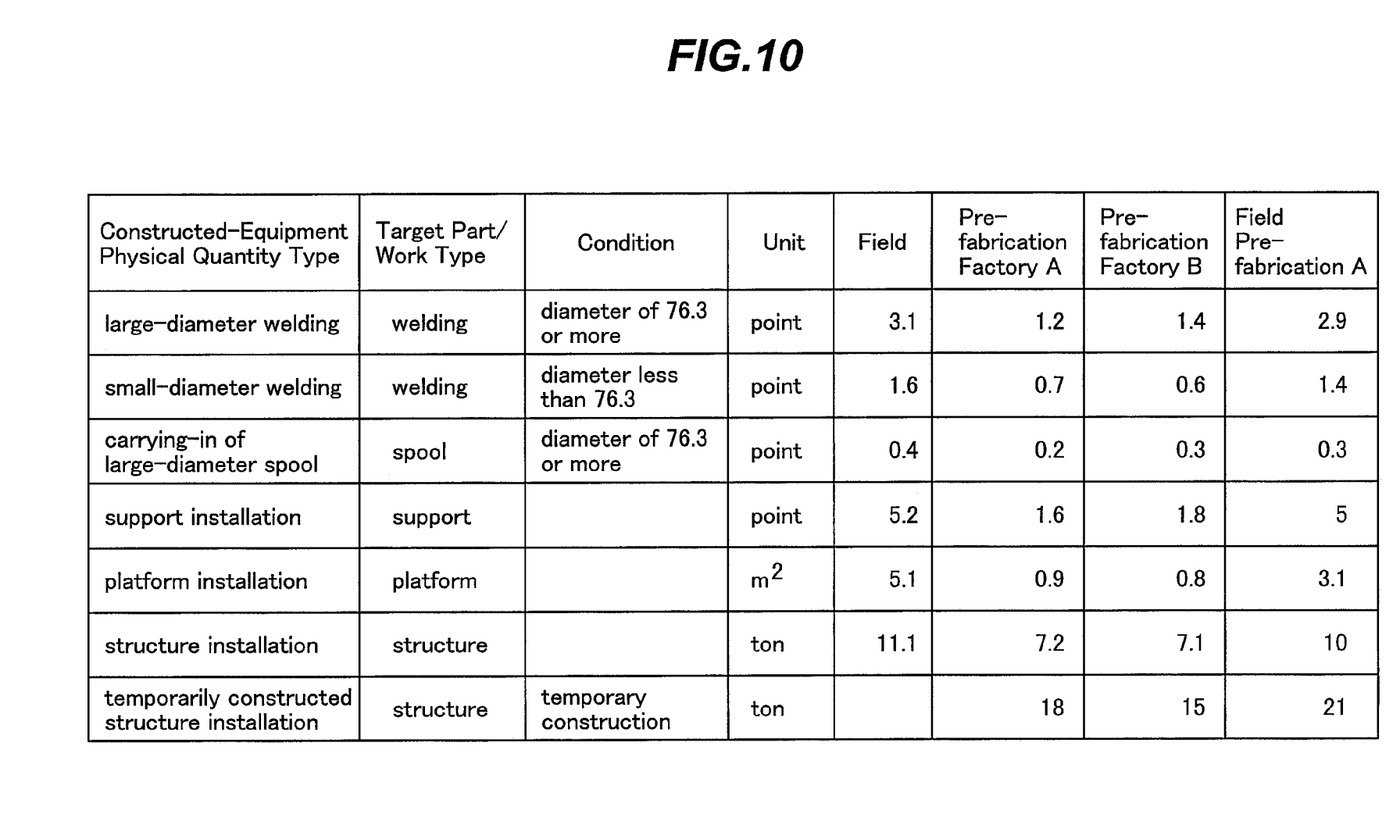
FIG. 10 shows one example of a unit rate table.

A unit rate table of FIG. 10 shows, by way of example, values of work unit rates in the field (installation place) and various prefabrication factories, which are stored per module type. In FIG. 10, a column of "Constructed-Equipment Physical Quantity Type" stores the name of data category. Columns of "Target Part/Work Type" and "Condition" store respectively the target constructed-equipment part or work and the classification condition thereof. A column of "Unit" stores the unit of the physical quantity. Columns of "Field", "Prefabrication Factory A-N" store respective values of the unit rates in the field and the prefabrication factories. The values stored in the table of FIG. 10 can be edited by the user.

The above-mentioned unit-rate reduction effect per module can be calculated by obtaining the physical quantity information of the constructed equipment in the module from the constructed-equipment physical quantity data, obtaining the unit-rate reduction effect values of the individual constructed-equipment parts from the unit rate table in accordance with the constructed equipment type and the construction place, multiplying the physical quantity values by the unit-rate reduction effect values, and totalizing the products for all the parts in the module.

Then, in step 903 of FIG. 9, determination is made on a transportation cost effect. More specifically, outer dimensions of the module are first determined. The outer dimensions of the module are obtained from the differences between maximum and minimum coordinate values of the parts integrated into the module in the X-, Y- and Z-directions during the transportation. This method is performed by obtaining, for all the constructed-equipment parts corresponding to the target module number in the constructed-equipment arrangement data and the constructed-equipment transportation arrangement data, the maximum and minimum coordinate values of the individual constructed-equipment parts in the X-, Y- and Z-directions from the shape type data, and further obtaining, based on those maximum and minimum coordinate values in the X-, Y- and Z-directions, the maximum and minimum values of all the constructed-equipment parts in the module in the X-, Y- and Z-directions.

When the same constructed-equipment part ID data is stored in the transportation arrangement data and the constructed-equipment transportation arrangement data, the arrangement data in the constructed-equipment transportation arrangement data is used in order to reflect the arrangement state during the transportation.

Figure 11:
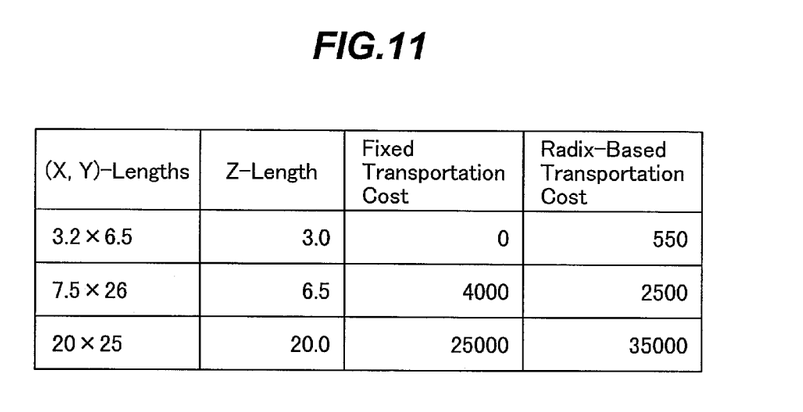
FIG. 11 shows one example of the data storage format of a transportation cost table.

The transportation cost is then determined based on the outer dimensions of the module (i.e., the module size). A transportation cost table storing the transportation cost by the transportation means such as track, trailer, rail transport or ship depending on the module size is used for the determination. FIG. 11 shows one example of the data storage format of the transportation cost table.

In FIG. 11, columns of "(X, Y)-Lengths" and "Z-Length" store respectively the maximum lengths of the outer dimensions in the (X, Y)-directions and the Z-direction. Also, columns of "Fixed Transportation Cost" and "Radix-Based Transportation Cost" store respectively the fixed cost required for the transportation and the cost distributed depending on the radix. In the transportation cost table of FIG. 11, items are sorted in ascending order for values of the fixed transportation cost and the radix-based transportation cost.

Corresponding to the transportation module size determined as described above, transportation means of the target module is determined from the transportation cost table shown in FIG. 11, that transportation means data not only satisfying the condition that the outer module size falls within the maximum transportation size, but also being ranked first in the ascending order. Note that, regarding the (X, Y)-lengths, values of the (X, Y)-lengths are replaceable. Assuming the module occupancy to be β, the module transportation cost is calculated from the transportation cost data, i.e., the result of the above determination, by using a formula (2) given below:

$$\text{fixed transportation cost} + \beta \times \text{radix-based transportation cost} \quad (2)$$

In the above formula (2), the module occupancy β is obtained as a ratio of the area calculated from the (X, Y)-lengths of the transportation size in the transportation cost table to an area calculated from the (X,Y)-lengths of the transportation module, or a ratio of the larger value of the (X,Y)-lengths of the transportation size in the transportation cost table to the larger value of the (X, Y)-lengths of the transportation module.

Further, the module transportation cost effect is determined by subtracting the transportation cost in the case of no modularization from the module transportation cost calculated above. The transportation cost in the case of no modularization is calculated in a similar manner to that in the above module transportation cost based on the sizes in the X-, Y- and Z-directions obtained from data of the part types representing devices, which cannot be transported in flat stacking, in the constructed-equipment arrangement data.

In step 904 of FIG. 9, determination is made on a module temporary construction cost effect.

More specifically, the physical quantity of the temporarily constructed equipment parts in the target module is obtained by searching for the relevant module name and the data in the column of "Temporary Construction" from the constructed-equipment physical quantity data shown in FIG. 8. Additionally, the unit rate obtained by totalizing the installation cost and the material cost of the temporarily constructed equipment is stored in the unit rate table shown in FIG. 10 with "temporary construction" put in the column of "Construction". The temporary construction cost is calculated by multiplying the physical quantity of the temporarily constructed equipment parts in the target module by the value of the temporarily-constructed structure installation cost in the unit rate table.

In step 906 of FIG. 9, determination is made on a density reduction effect, i.e., an improvement of installation workability which is resulted from a reduction of density in a space not occupied by the module (i.e., in a region of the constructed-equipment arrangement scheduled area except for the region where the module is to be installed) with application of the modularization. Assuming that a number N of modules are present in the area, the density reduction effect of one k among those modules is obtained from a formula (3) given below:

$$\frac{V_A - \sum_{i=1}^{n} v_i}{V_A - \sum_{i=1}^{n} V_i} \left( W_A - \sum_{i=1}^{n} W_i \right) \frac{\frac{V_A - v_k}{V_A - V_k}(W_A - W_k)}{\sum_{i=1}^{n} \frac{V_A - v_i}{V_A - V_i}(W_A - W_i)} \quad (3)$$

In the above formula (3), $V_A$, $v_A$, $W_A$, $V_i$, $v_i$ and $W_i$ indicate respective outer dimension volumes, sums of inner constructed-equipment volumes, and sums of inner man-hours in an area and a module i.

The sum of the constructed-equipment volumes in each of the area and the module is calculated by totalizing the volumes of the individual constructed-equipment parts in the target area or module based on the constructed-equipment arrangement data. The sum of inner man-hours is calculated by, for each part of the constructed equipment in the target area or module, multiplying the physical quantity values of the number of points, area (square measure) and weight by values in the unit rate table corresponding to the relevant physical quantity type and working places, and totalizing the products.

In step 907 of FIG. 9, determination is made on a field physical-quantity reduction effect that is resulted from a reduction of the physical quantity in the field and from a reduction of various overhead costs with application of the modularization.

The overhead costs are reduced with a cut of temporary construction scaffolds, field overseers, worker offices, lodging houses, work materials, etc., the cut being resulted from a reduction of field work with application of the modularization. Such a reduction effect is approximately calculated based on a linear formula of $(k \times W_M)$ using man-hours required for field installation of the constructed equipment in the module. $W_M$ represents the man-hours required for field installation of the constructed equipment in the module, which are calculated by multiplying the in-module physical quantities stored as the constructed-equipment physical quantity data by values of the field unit rates of the constructed-equipment physical quantity types in the unit rate table, and totalizing the products. Also, k represents a value of each overhead cost that is obtained, based on an approximation formula including the construction term, the field man-hours, the field physical quantity, and the peak number of workers as parameters, by determining a contribution factor of each parameter and assuming such approximation that the parameter is proportional to the field man-hours. The value of k can be inputted by the user.

The module evaluation unit 103 in FIG. 1 calculates a total of the module evaluation results for all the items, which are obtained in steps 902-907 of FIG. 9, and displays the calculated total as a numerical value, while the unit-rate reduction effect, the density reduction effect, and the field physical-quantity reduction effect are regarded as plus effects and the transportation cost effect and the temporary construction cost effect are minus effects. Based on the displayed numerical value, the user can objectively evaluate effectiveness of the modularization.

Figure 12:
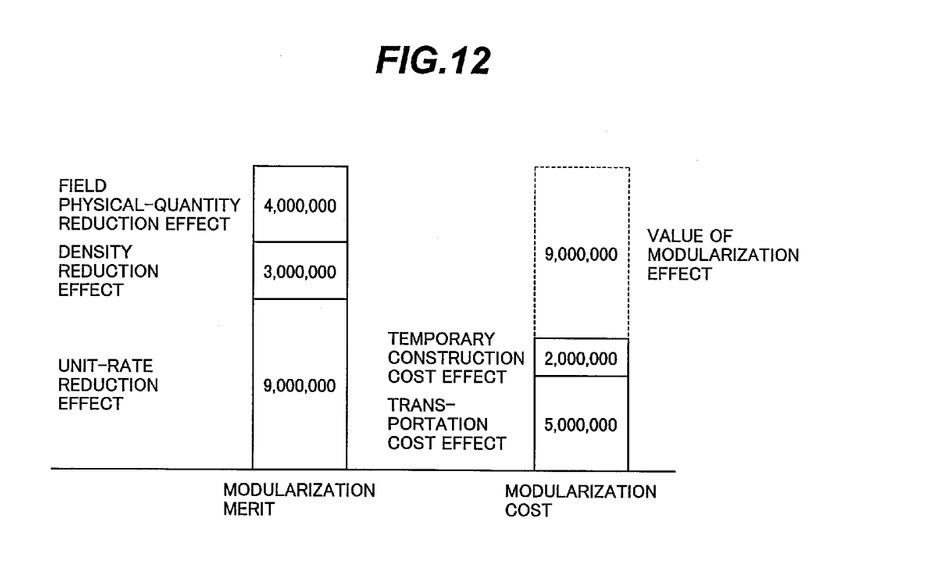
FIG. 12 shows one example of the module evaluation result displayed on a display.

Further, separately displaying the numerical value per item makes the user able to more easily understand the superior point of each module and the point requiring an improvement. FIG. 12 shows one example of the module evaluation result displayed on the display 104. In FIG. 12, the merit of the modularization and the cost required for the modularization are displayed so as to indicate how much a value of the modularization effect is.

In the example of FIG. 12, the modularization merit includes the effect of reducing the physical quantity in the field, the density reduction effect (i.e., the effect of enlarging a region in the site other than the modules with the modularization), and the unit-rate reduction effect. The cost required for the modularization includes the temporary construction cost and the transportation cost. The value of the modularization effect is provided as a value obtained by subtracting the cost required for the modularization from the modularization cost.

By displaying the individual items for the value of the modularization on the display 104 as shown in FIG. 12, the user can determine overall effectiveness of the modular construction method in consideration of the transportation cost and so on.

According to the first embodiment of the present invention, as described above, since the modularization is evaluated by calculating the transportation cost required for transportation of the module and the temporary construction cost and by comparing those costs with the merit of the modularization, it is possible to realize a module evaluation method and system which can quickly determine overall effectiveness of the modular construction method in an automatic manner, taking into account the transportation cost and so on.

Incidentally, the module evaluation system shown in FIG. 1 can be realized with a personal computer and, though not shown in FIG. 1, it includes a data input device (such as a keyboard and a mouse).

A second embodiment of the present invention will be described below.

The second embodiment of the present invention is intended to, when information for definition of a module is not included in the constructed-equipment layout data, make determination on effectiveness of the range of a designated imaginary module, or automatic determination on the effective range of modularization.

The basic configuration of the module evaluation system according to the second embodiment is the same as that of the first embodiment shown in FIG. 1, and therefore a detailed description of the system configuration is omitted here.

Figure 13:
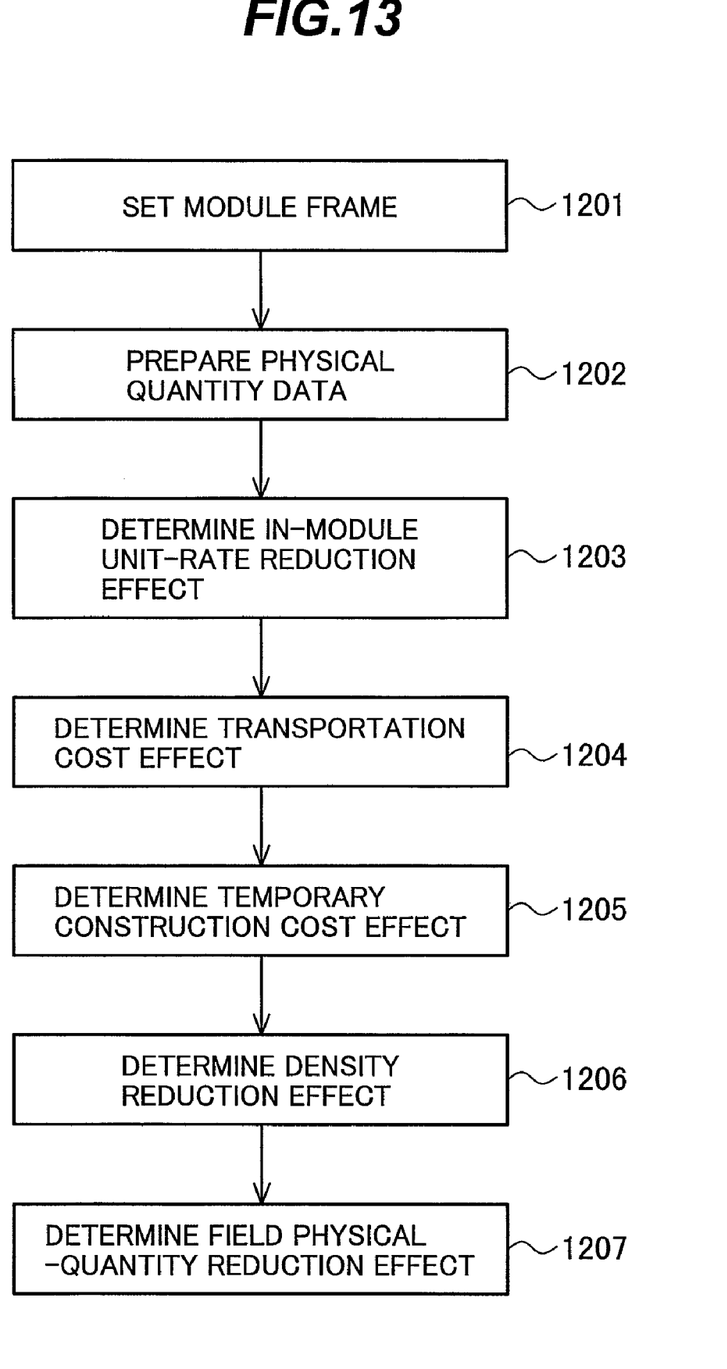
FIG. 13 is a flowchart of processing for determination of modularization effectiveness in a second embodiment of the present invention.

FIG. 13 is a flowchart of processing for determination of the modularization effectiveness in the second embodiment.

First, the range of a module frame is set in step 1201 of FIG. 13. Herein, the term "module frame" means an imaginary rectangular parallelepiped surrounding the constructed equipment, which is inputted by the user or set by the system and which is defined by six numerical values, i.e., minimum and maximum coordinate values in the X-, Y- and Z-directions.

The constructed equipment parts included within the module frame are determined from the constructed-equipment arrangement data. More specifically, the constructed equipment parts included within the module frame are determined from the shape type data and the arrangement data in the constructed-equipment arrangement data, and module numbers are set for those constructed equipment parts which are regarded as parts integrated into the module. At that time, when the constructed equipment part in the module exists in a state straddling over two module frames and its part type is other than piping, an adjustment screen of the module frame is displayed by enlarging the module frame to a minimum rectangular parallelepiped enough to contain the relevant part, or by selecting a maximum rectangular parallelepiped excepting the relevant part.

When the part type is piping, a welding point is set at a cross position between the module frame and a piping part and is added to the constructed-equipment construction data.

The processing procedures in steps 1202-1204, 1206 and 1207 of FIG. 13 are the same as those in steps 901-903, 906 and 907 of FIG. 9 which shows the flowchart for the first embodiment, and therefore a detailed description of those steps is not omitted here.

When a modularization range is set using the module frame, detailed design of the module is not yet performed and the temporarily constructed structure information is not yet inputted in the constructed-equipment arrangement data at that time. In the determination on the temporary construction cost effect in step 1205 of FIG. 13, therefore, estimative determination on the temporary construction cost effect has to be performed.

Structural parts in the module are required to be immobilized by using steel-frame members, such as a platform, a structure and a support, for maintaining strength at a level necessary during the transportation and carrying-in. Accordingly, in the range coverable by the platform and the structure which are made of steel materials and constitute a basic skeleton of the module, the amount of members to be added is small. On the contrary, the amount of members to be added is increased in the range where the basic skeleton is not present.

Assuming that $W_F$ represents field-based installation man-hours of the constructed equipment part positioned, on a plan view looking the module from above, within the range where the steel-frame members, such as the platform and the structure, are installed, and $W_O$ represents field-based installation man-hours of the constructed equipment part positioned outside the range where the steel-frame members are installed, a value of the module temporary construction cost effect can be calculated from a formula (4) given below:

$$k_1 \times W_F + k_2 \times W_O \tag{4}$$

In the above formula (4), $k_1$ and $k_2$ are values capable of being registered or designated by the user and satisfy the relationship of $k_2 > k_1$.

Figure 14:
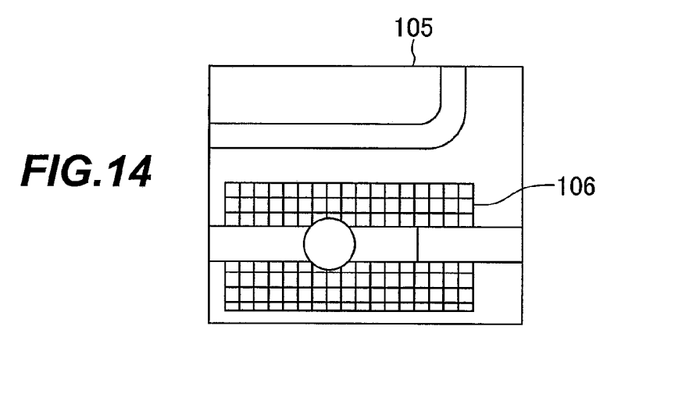
FIG. 14 shows one example of a screen image displayed for use in setting a module frame.

FIG. 14 shows one example of a screen image displayed for use in setting the module frame. An outer frame 105 represents the modularization range, and a hatched portion 106 represents the range where the steel-frame member is installed. The constructed equipment existing on the steel-frame member is determined by comparing respective X- and Y-coordinate values of the constructed equipment with those of the structure and platform parts based on the shape type data and the arrangement data in the constructed-equipment arrangement data. When the constructed equipment straddles over the boundary of the steel-frame member, it is determined as being positioned on the steel-frame member.

For the constructed equipment parts in the module which are determined as being positioned on the steel-frame member or positioned outside it, in-module man-hours are calculated from the constructed-equipment physical quantity data and the data in the unit rate table and are put in the above formula (4).

By executing the processes of steps 1201-1207 of FIG. 13 as described above, when the information for definition of the module is not yet present, the modularization effect can be determined through the steps of setting an imaginary modularization range, and estimating the temporary construction cost effect. Therefore, a suitable modularization range can be selected in an initial design stage.

A third embodiment of the present invention represents an example in which a suitable modularization range can be automatically or easily selected for the aid to the user. This third embodiment is in consideration of such module requirements that the modularization effect can be increased by suppressing a size increase which leads to an increase of the transportation cost, by performing necessary field work of apparatus assembly, etc. in an apparatus manufacturing factory, etc. for an improvement of working efficiency, by increasing a working cost reduction effect, and by reducing the temporary construction cost.

The basic configuration of the module evaluation system according to the third embodiment is the same as that of the first embodiment shown in FIG. 1, and therefore a detailed description of the system configuration is omitted here.

Figure 15:
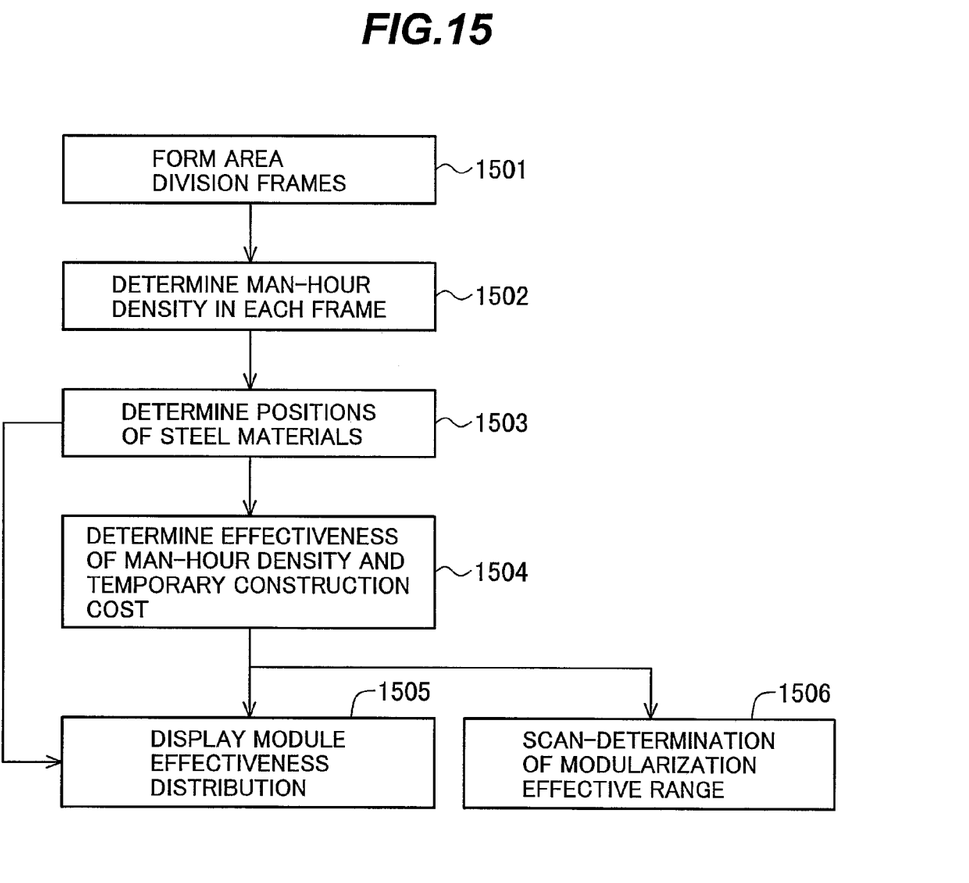
FIG. 15 is a flowchart of processing for determination of modularization effectiveness in a third embodiment of the present invention.
Figure 16:
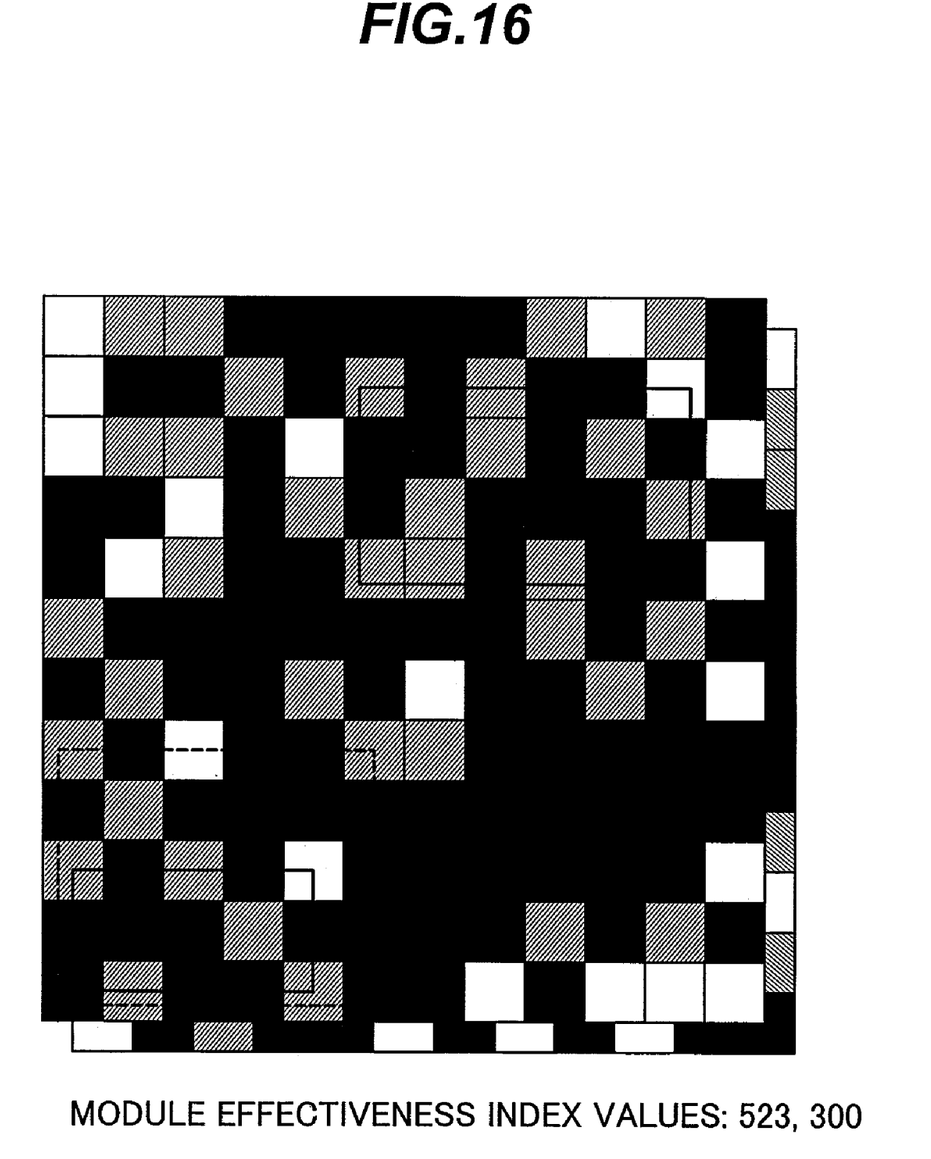
FIG. 16 shows one example of a user display/operating screen.

FIG. 15 is a flowchart of processing for determination of the modularization effectiveness in the third embodiment of the present invention, and FIG. 16 shows one example of a user display/operating screen.

As shown in FIG. 15, first, a target area is divided in the height direction as per upper limit size during the module transportation, and the target area is divided at constant intervals in a horizontal plane to form division frames in a grid pattern (step 1501, see FIG. 16). The smaller the division interval in the horizontal plane, the higher is the accuracy of the evaluation. A value of the division interval can be optionally set by the user.

Then, in step 1502, the man-hour density in each division frame is determined. The man-hour density is obtained by determining all the constructed equipment parts existing within each frame from the coordinate values of the constructed equipment parts, which are stored in the constructed-equipment arrangement data, and by summing up man-hour values of the parts based on the constructed-equipment modularization work data and the unit rate data, thereby calculating a man-hour value in the relevant frame. At that time, when the constructed equipment straddles over a plurality of frames, the man-hour value is distributed to those frames in accordance with respective volume proportions at which the constructed equipment overlaps the frames.

In step 1503, the positions of steel materials (steel materials included in the constructed equipment itself) capable of being used as reinforcing materials during the transportation, etc. is determined. In this step 1503, as in the above-described step 1205 of FIG. 13, the coordinate values of each steel material in the (X, Y) horizontal plane is determined from the constructed-equipment arrangement data. As a simple manner for deciding the modularization range, it is effective to select a steel-material installed range where the man-hour density is high and the number of temporarily constructed members is small. In such a case, the process flow skips from step 1503 to step 1505 in which a modularization effectiveness distribution is displayed.

The modularization effectiveness distribution is presented by displaying not only respective grid-like zones within the area in different colors depending on values of the man-hour density, but also the positions of the steel materials in an overlapped relation. By looking at the modularization effectiveness distribution thus displayed, the user can easily select a modularization effective range where the man-hour density is high and the steel materials are present.

In order to further reduce the module transportation cost, the module transportation size is held down to an upper limit in accordance with a transportation process of a lower cost. For that purpose, a transportation upper limit size in the horizontal plane of the module is displayed in an overlapped relation to the modularization effectiveness distribution, thus allowing the user to select the modularization range while moving the displayed transportation upper limit size. As a result, it is possible to facilitate more effective module selection.

By adding the process of step 1504 between steps 1503 and 1505, the modularization effective range can be selected in a simpler manner.

In step 1504, effectiveness of both the man-hour density and the temporary construction cost is determined.

More specifically, assuming that the volume of each frame is V, the man-hour density calculated in step 1502 per frame is $\rho_M$, and a proportion at which the steel materials cover the horizontal plane of each frame is $\alpha$, the modularization effectiveness per frame is expressed by a formula (5) given below:

$$k_W \rho_M V - k_W \rho_M V(k_1 \alpha + k_2 (1-\alpha)) \quad (5)$$

In the above formula (5), $k_W$ is a coefficient based on a ratio of the effect of incorporating man-hours in the module to the temporary construction cost effect and is capable of being set by the user. A value of the modularization effectiveness is calculated per frame from the formula (5), and calculated values are displayed in different shades similarly to the screen image shown in FIG. 16. A total of the calculated values within the frame designated by the user is also displayed. This enables the user to directly select the modularization effective range.

Further, by executing scan-determination of the modularization effective range in step 1506 in addition to step 1504, the modularization effective range can be automatically selected. More specifically, with respect to the distribution data of the modularization effectiveness value in the horizontal plane which is obtained in step 1505, a rectangular box corresponding to a module transportation limit size in the horizontal plane is successively moved at constant intervals from (X, Y) lower limit values to upper limit values in the horizontal plane of the area. Then, the modularization effectiveness value is obtained by summing up respective modularization effectiveness values of the division frames in the range overlapping with the rectangular box.

After calculating the modularization effectiveness values at all positions, the calculation results are displayed as modularization range candidates on the screen in descending order from the maximum effectiveness value. As a result, automatic selection of the modularization range candidates can be realized.

Further, after performing the automatic selection of the modularization range candidates and displaying the selected candidates in descending order of the modularization effectiveness value along with the values themselves, the operator can select the modularization range, which is actually employed, from the displayed candidates.

The second and third embodiments of the present invention can also provide similar advantages to those in the first embodiment.

What is claimed is:
1. A module evaluation method comprising the steps of:
preparing constructed-equipment layout data including constructed-equipment arrangement schedule data for a region where arrangement of constructed equipment is scheduled, constructed-equipment modularization work data, and arrangement data for transportation of the modularized constructed-equipment to the arrangement scheduled region, and constructed-equipment physical quantity data representing the number, sizes and weights of individual units of the constructed equipment;
calculating, based on the constructed-equipment layout data and the constructed-equipment physical quantity data, a unit-rate reduction amount resulting from modularizing the constructed equipment, a transportation cost required for transporting the modularized constructed-equipment to the arrangement scheduled region, a temporary construction cost including a cost of reinforcing materials to reinforce the modularized constructed-equipment for transporting the modularized constructed-equipment to the arrangement scheduled region, and a field physical-quantity reduction effect cost corresponding to a reduction of physical quantity required for assembling the constructed equipment in the arrangement scheduled region, which is resulted from modularizing the constructed equipment; and comparing, based on the calculated costs, a cost required for modularizing the constructed equipment with a cost reduction resulting from modularizing the constructed equipment, and evaluating the modularization.

2. The module evaluation method according to claim 1, further comprising a step of calculating a cost reduction resulting from a reduction of a work density in the arrangement scheduled region with the modularization of the constructed equipment.

3. The module evaluation method according to claim 1, further comprising a step of at least displaying a module evaluation result.

4. The module evaluation method according to claim 1, wherein said reinforcing materials to reinforce the constructed equipment are set based on arrangement of steel materials of the modularized constructed-equipment.

5. The module evaluation method according to claim 4, further comprising a step of evaluating the modularization while changing a module frame used to decide in which section of the arrangement scheduled region the modularization is to be performed.

6. The module evaluation method according to claim 4, further comprising a step of determining, as the modularized section, a range where a man-hour density is high and the temporary construction cost is low.

7. The module evaluation method according to claim 4, further comprising a step of displaying the arrangement scheduled region for changing the module frame used to decide in which section of the arrangement scheduled region the modularization is to be performed.

8. A module evaluation system comprising:

constructed-equipment layout data storage means for storing constructed-equipment layout data including constructed-equipment arrangement schedule data for a region where arrangement of constructed equipment is scheduled, constructed-equipment modularization work data, and arrangement data for transportation of the modularized constructed-equipment to the arrangement scheduled region;

constructed-equipment physical quantity data storage means for storing physical quantity data representing the number, sizes and weights of individual units of the constructed equipment; and evaluation means for calculating, based on the constructed-equipment layout data and the constructed-equipment physical quantity data, a unit-rate reduction amount resulting from modularizing the constructed equipment, a transportation cost required for transporting the modularized constructed-equipment to the arrangement scheduled region, a temporary construction cost including a cost of reinforcing materials to reinforce the modularized constructed-equipment for transporting the modularized constructed-equipment to the arrangement scheduled region, and a field physical-quantity reduction effect cost corresponding to a reduction of physical quantity required for assembling the constructed equipment in the arrangement scheduled region, which is resulted from modularizing the constructed equipment, and comparing, based on the calculated costs, a cost required for modularizing the constructed equipment with a cost reduction resulting from modularizing the constructed equipment, thereby evaluating the modularization.

9. The module evaluation system according to claim 8, wherein said evaluation means calculates a cost reduction resulting from a reduction of a work density in the arrangement scheduled region with the modularization of the constructed equipment.

10. The module evaluation system according to claim 8, further comprising display means for at least displaying a module evaluation result of said evaluation means.

11. The module evaluation system according to claim 8, wherein said reinforcing materials to reinforce the constructed equipment are set based on arrangement of steel materials of the modularized constructed-equipment.

12. The module evaluation system according to claim 11, wherein said evaluation means evaluates the modularization while changing a module frame used to decide in which section of the arrangement scheduled region the modularization is to be performed.

13. The module evaluation system according to claim 12, wherein said evaluation means determines, as the modularized section, a range where a man-hour density is high and the temporary construction cost is low.

14. The module evaluation system according to claim 11, further comprising means for displaying the arrangement scheduled region for changing the module frame used to decide in which section of the arrangement scheduled region the modularization is to be performed.

* * * * *